US012695591B2

(12) United States Patent
Bouthemy et al.

(10) Patent No.: US 12,695,591 B2
(45) Date of Patent: Jul. 28, 2026

(54) SECURITY IN NETWORKS

(71) Applicant: T-Mobile USA, Inc., Bellevue, WA (US)

(72) Inventors: Jean-Luc Rene Bouthemy, Sammamish, WA (US); Gregg Allan Atkins, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 174 days.

(21) Appl. No.: 18/603,996

(22) Filed: Mar. 13, 2024

(65) Prior Publication Data

US 2025/0293852 A1     Sep. 18, 2025

(51) Int. Cl.
H04L 9/00          (2022.01)
H04L 9/32          (2006.01)

(52) U.S. Cl.
CPC ............ H04L 9/006 (2013.01); H04L 9/3268 (2013.01)

(58) Field of Classification Search
CPC .............................. H04L 9/006; H04L 9/3268
See application file for complete search history.

(56) References Cited

U.S. PATENT DOCUMENTS

| | | |
|---|---|---|
| 6,918,038 B1 | 7/2005 | Smith et al. |
| 7,174,018 B1 | 2/2007 | Patil et al. |
| 7,260,834 B1 | 8/2007 | Carlson |
| 7,302,487 B2 | 11/2007 | Ylonen et al. |
| 7,366,894 B1 | 4/2008 | Vilhuber et al. |
| 7,401,216 B2 | 7/2008 | Arkko et al. |
| 7,594,262 B2 | 9/2009 | Hanzlik et al. |
| 7,933,253 B2 | 4/2011 | Akram et al. |
| 7,984,291 B2 | 7/2011 | Eronen et al. |
| 8,019,989 B2 | 9/2011 | Bosler |
| 8,301,880 B2 | 10/2012 | Jennings et al. |
| 8,374,354 B2 | 2/2013 | Berggren |
| 8,631,134 B2 | 1/2014 | Ceragioli et al. |
| 8,806,565 B2 | 8/2014 | Aura et al. |
| 9,088,415 B2 | 7/2015 | Gagliano et al. |
| 9,137,222 B2 | 9/2015 | Haeger et al. |
| 9,438,628 B2 | 9/2016 | Haridas et al. |
| 9,668,139 B2 | 5/2017 | Thakare et al. |
| 9,729,580 B2 | 8/2017 | Mattes et al. |
| 9,736,184 B2 | 8/2017 | Kumar et al. |
| 10,185,829 B2 | 1/2019 | Sasin et al. |

(Continued)

FOREIGN PATENT DOCUMENTS

| | | |
|---|---|---|
| CN | 106717044 B | 4/2018 |
| CN | 104780198 B | 8/2020 |

(Continued)

*Primary Examiner* — Hany S. Gadalla
(74) *Attorney, Agent, or Firm* — Perkins Coie LLP

(57) ABSTRACT

Techniques related to providing secure communications in a network are disclosed. In one example, an alternative for providing secure communication in an automated way in a network including retrieving by a network server configured to manage one or more network nodes in the network a security certificate and other security configuration corresponding to a network node. Transmitted, by the network server, including pair(s) of public and private keys and other parameters to the network node to enable the network node to establish a secure communication channel with at least another network node.

20 Claims, 14 Drawing Sheets

(56) References Cited

U.S. PATENT DOCUMENTS

| | | | |
|---|---|---|---|
| 10,476,765 B2 | 11/2019 | Martin et al. | |
| 10,700,860 B2 | 6/2020 | Walrant | |
| 10,839,339 B2 | 11/2020 | Skaaksrud | |
| 10,848,319 B2 | 11/2020 | Uhr et al. | |
| 10,986,174 B1 | 4/2021 | Sharma et al. | |
| 11,082,849 B2 | 8/2021 | Lee et al. | |
| 11,246,032 B1 | 2/2022 | Maass et al. | |
| 11,290,349 B2 | 3/2022 | Martin et al. | |
| 11,290,879 B2 | 3/2022 | Stahl | |
| 11,601,288 B1 * | 3/2023 | Bacon | H04L 63/205 |
| 2005/0175183 A1 | 8/2005 | Ovadia et al. | |
| 2005/0177749 A1 | 8/2005 | Ovadia | |
| 2008/0098212 A1 | 4/2008 | Helms et al. | |
| 2022/0188444 A1 * | 6/2022 | Stoler | H04L 9/006 |
| 2023/0198784 A1 * | 6/2023 | Miller | H04L 63/0869 |
| | | | 713/151 |
| 2025/0159589 A1 * | 5/2025 | Zhang | H04W 48/08 |

FOREIGN PATENT DOCUMENTS

| | | | |
|---|---|---|---|
| CN | 108029016 B | 3/2021 | |
| CN | 112291179 B | 4/2022 | |
| CN | 111917685 B | 5/2022 | |
| CN | 110537346 B | 3/2023 | |
| CN | 111817869 B | 5/2023 | |
| EP | 1396979 B1 | 7/2012 | |

* cited by examiner

1000

1010 retrieving a security certificate corresponding to a network node

1020 transmitting a pair of public and private keys to the network node to enable a secure communication channel

1100

1110 determining a pair of public
and private keys based on
the security certificate

1120 establish a secure
communication channel
with another network
function based on an
encryption protocol using
the pair of public and
private keys

1200

SECURITY IN NETWORKS

BACKGROUND

In wireless cellular networks, a core network provides key functionalities on the network such as access and mobility management, subscriber authentication with the network, quality of service, charging, and call routing/session management. For Fifth Generation (5G) standalone networks, the core network includes the Service Based Architecture, which comprises a set of interconnected Network Functions exposing their functionalities through defined interfaces.

BRIEF DESCRIPTION OF THE DRAWINGS

Detailed descriptions of implementations of the present invention will be described and explained through the use of the accompanying drawings.

Figure 1:
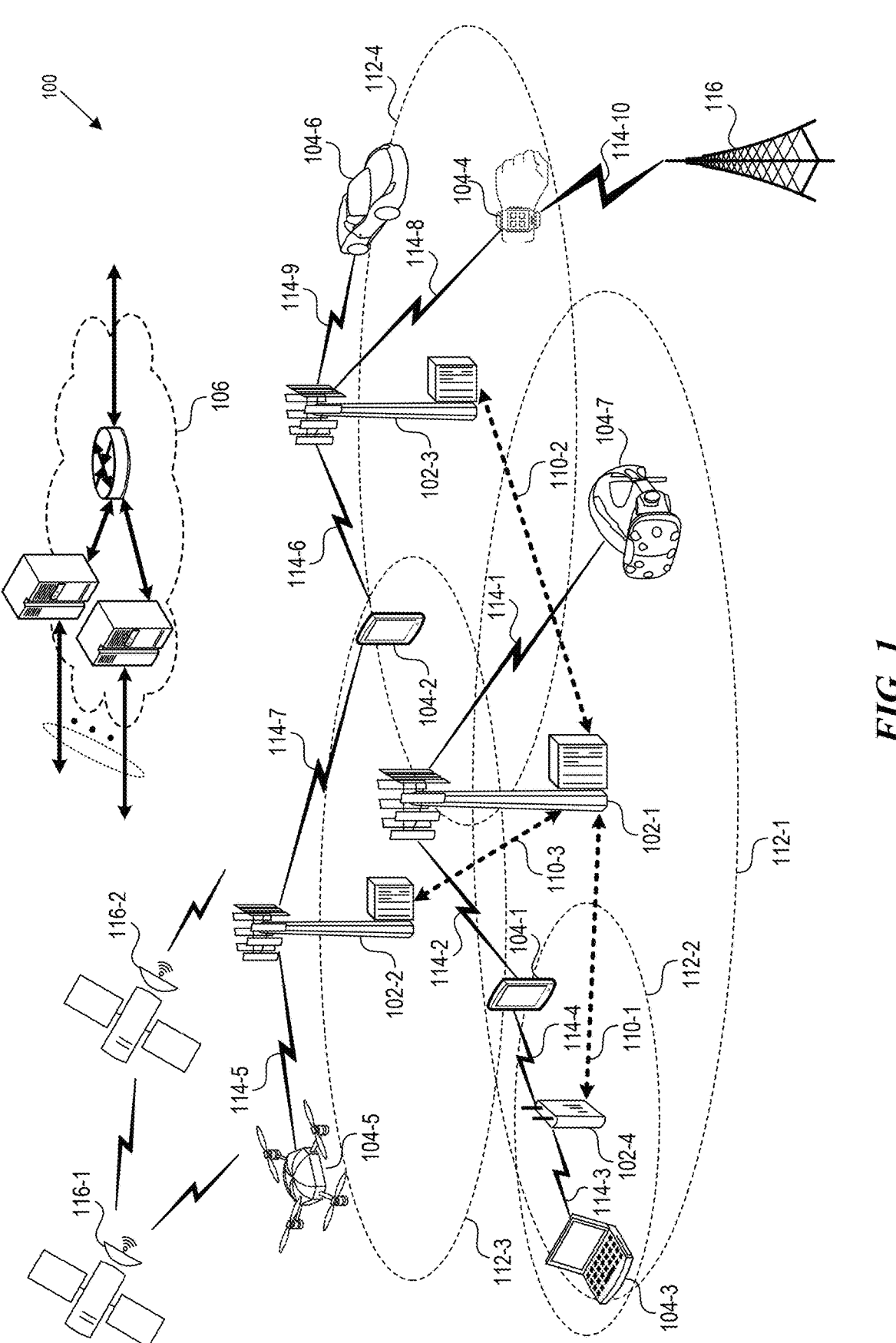
FIG. 1 is a block diagram that illustrates a wireless telecommunication network in which aspects of the disclosed technology are incorporated.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The architectures of the cellular networks, such as 2G, 3G, and 4G networks, do not account for the probability of an intruder gaining access inside the core network. A rogue network node with access to the inter-operator network(s) can perform harmful operations to the network and cause great damage. In the 5G networks, new security features, such as inter-operator security, subscriber privacy, mutual authentication, and confidentiality protection, have been implemented. However, 5G network features also bring new security concerns, particularly in the core network.

This patent document discloses techniques that can be implemented in various embodiments to provide an option for secure communications. More details are provided in the core network under the Service Based Architecture (SBA); however, these principles apply to other domains. In particular, the disclosed techniques can be implemented to support security controls at the network slice level by providing security contexts as part of network slice provisioning. The disclosed techniques can also be applied to establish secure communication within the Radio Access Network (such as gNBs) or at the transport level of different network nodes. In some embodiments, the disclosed techniques can be implemented as an extension of the model provided by the Global System for Mobile Association (GSMA).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.
Wireless Communication System Some embodiments are described with reference to Third Generation Partnership Project (3GPP) Fifth Generation (5G) or Sixth Generation (6G) standard for ease of understanding and the described technology may be implemented in different wireless system that implement protocols other than the 5G or 6G protocol.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. It is noted that the base station can also provide wired access to communication devices. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies above 24 28 GHz. In some implementations, the wireless device 104 can operatively couple to a base station 102 over a Long-Term Evolution/Long-Term Evolution-Advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/en-gNB/gNBs, small cell eNBs/en-gNB/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or NR communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve extremely low user plane latency. In yet another example of 6G, the network 100 can implement a converged Wi-Fi and Core architecture to increase and improve indoor coverage.

5G Core Network Functions

Figure 2:
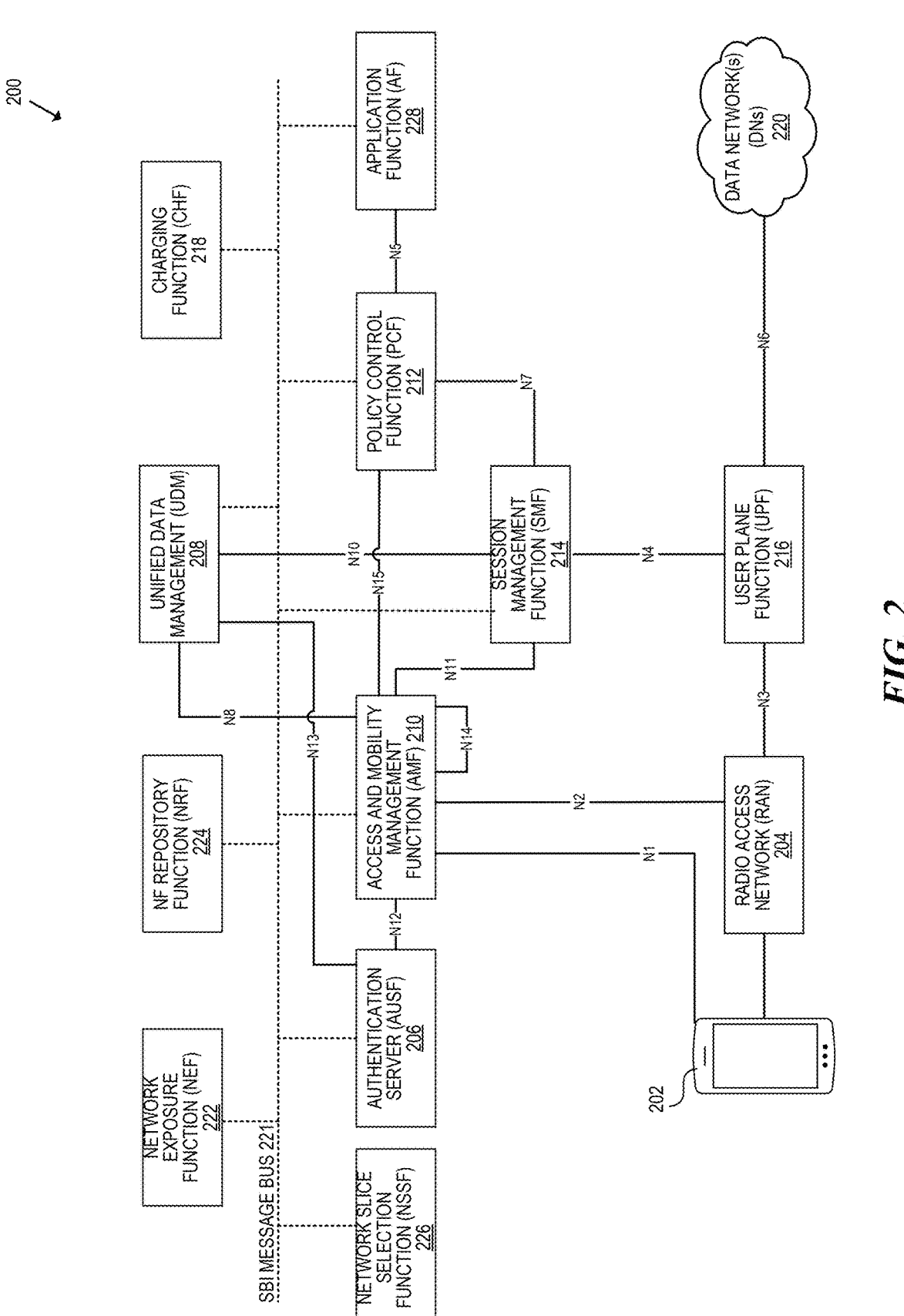
FIG. 2 is a block diagram that illustrates a 5G architecture including core network functions (NFs) that can implement aspects of the present technology.

FIG. 2 is a block diagram that illustrates an 5G architecture 200 including User Equipment 202, the Radio Access Network 204, the Core Network (i.e., 5G core network functions (NFs) that can implement aspects of the present technology), backhaul connecting RAN and Core Network, and Data Networks 220. A wireless device 202 can access the 5G network through a RAN (e.g., gNB) of a RAN 204. The RAN 204 can provide either wired access or wireless access to communication devices. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 facilitates network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under the Third-Generation Partnership Project (3GPP) Technical Specification 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and the AUSF can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Network Orchestration for Secure Communications

The Third-Generation Partnership Project (3GPP) standard requires authentication and authorization between the NFs as defined in 3GPP Technical Specification 33.501. However, the 3GPP standard does not define any provisioning of the secure protocols for the network. Accordingly, there remains a security risk in the network when security measures are not provisioned promptly for network nodes/servers. For example, a rogue NF may be deployed and gains access to the core network. The rogue NF can then perform operations without being detected, such as discovering the network topology, registering as a valid NF and providing malicious services, de-registering any NF (such as termination calls/sessions inappropriately), accessing confidential information, performing service degradation, and/or performing a Denial-of-Service (DOS) attack (e.g., by generating excessive charging records). To address such issues, techniques disclosed herein can be implemented to support security controls at the network slice level by providing security contexts as part of network slice provisioning. The disclosed techniques can also be applied to establish secure communication with the radio access nodes (RANs) or at the transport level of different network nodes.

In 5G communication systems, network slicing is a network architecture that enables the multiplexing of virtualized and independent logical networks on the same physical network infrastructure. Each network slice is an isolated end-to-end network tailored to fulfill diverse requirements requested by a particular application. Network slicing enables the construction/modification of services across the network domains. For example, service orchestration sets policies to meet Service-Level Agreements (SLAs) defined for the service.

Figure 3:
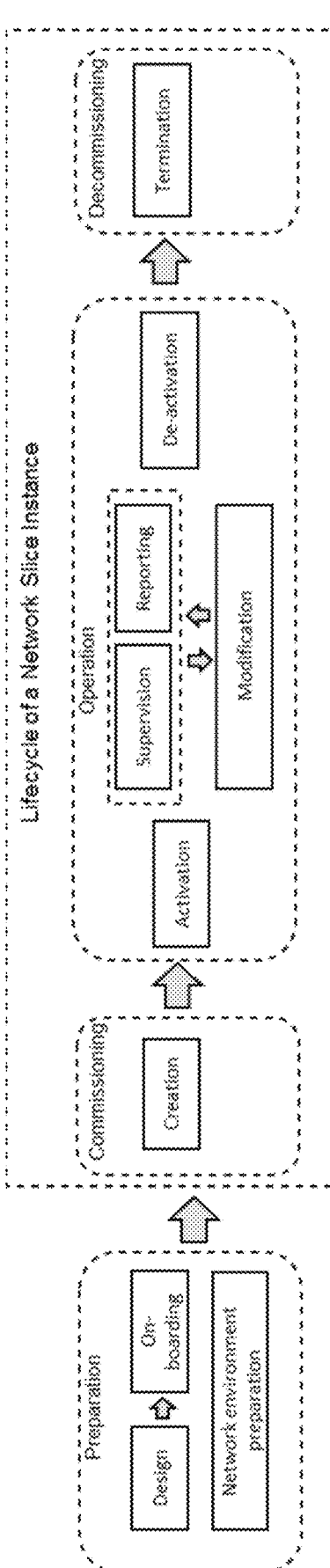
FIG. 3 illustrates an example lifecycle of a network slice instance.

To provide secure communication in the core network without substantially altering the existing core network architecture and implementations, a new slicing instance with secure communication tunnels can be created and activated by a network orchestrator. The network orchestrator is a network entity that automates the end-to-end lifecycle of infrastructure at scale. This includes installing the Operating System (OS), configuring and updating Commercial Off-The-Shelf (COTS) servers, configuring networking and storage, installing clusters, onboarding NFs and Network Service (NS) lifecycle management, and configuring resources (including credentials to support secure protocols, e.g., mutual Transport Layer Security (TLS)/TLS,), and Datagram TLS (DTLS) and/or Internet-Protocol Security (IPsec), and/or post quantum resistant algorithms such as Post-Quantum TLS. The orchestrator also supports the network slicing lifecycle. FIG. 3 illustrates an example lifecycle of a network slice instance. Upon receiving a request, the orchestrator provisions the different domains (Radio Access Network, Transport, and Core Network Details regarding the network orchestration framework can be found in the 3GPP Technical Specification 38.533.

Figure 4:
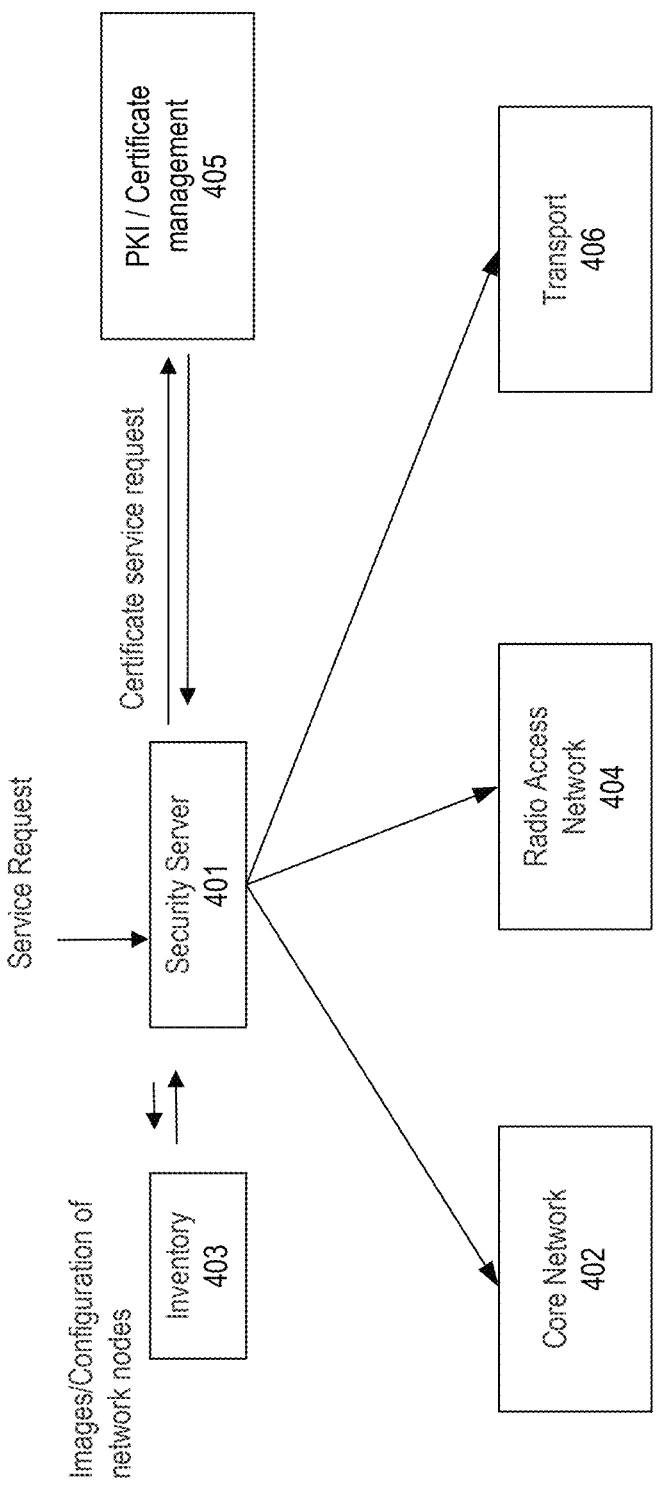
FIG. 4 illustrates an example architecture in accordance with one or more embodiments of the present technology.

FIG. 4 illustrates an example architecture in accordance with one or more embodiments of the present technology. When a network security server 401 (e.g., the network orchestrator) receives a service request for secure communication in the network, it initiates the provisioning of the network nodes by fetching the images and security configurations of network node(s) from an inventory server 403. In some embodiments, if the network nodes are related to NFs in the core network, the security server 401 can initiate the creation of a network slice instance. The security server 401 requests security certificates for the network node(s) from the Public Key Infrastructure (PKI) or a certificate management server 405. The security server 401 forms a security context of a network function based on the security certificate(s) and pushes the configuration of the security to components of the network, including network functions 402, the radio access network (RAN) 404 (such as the base stations gNB/eNB in LTE and 5G networks), and/or the transport layer 406 of various network nodes, to enable secure communications among the various components of the network.

Figure 5:
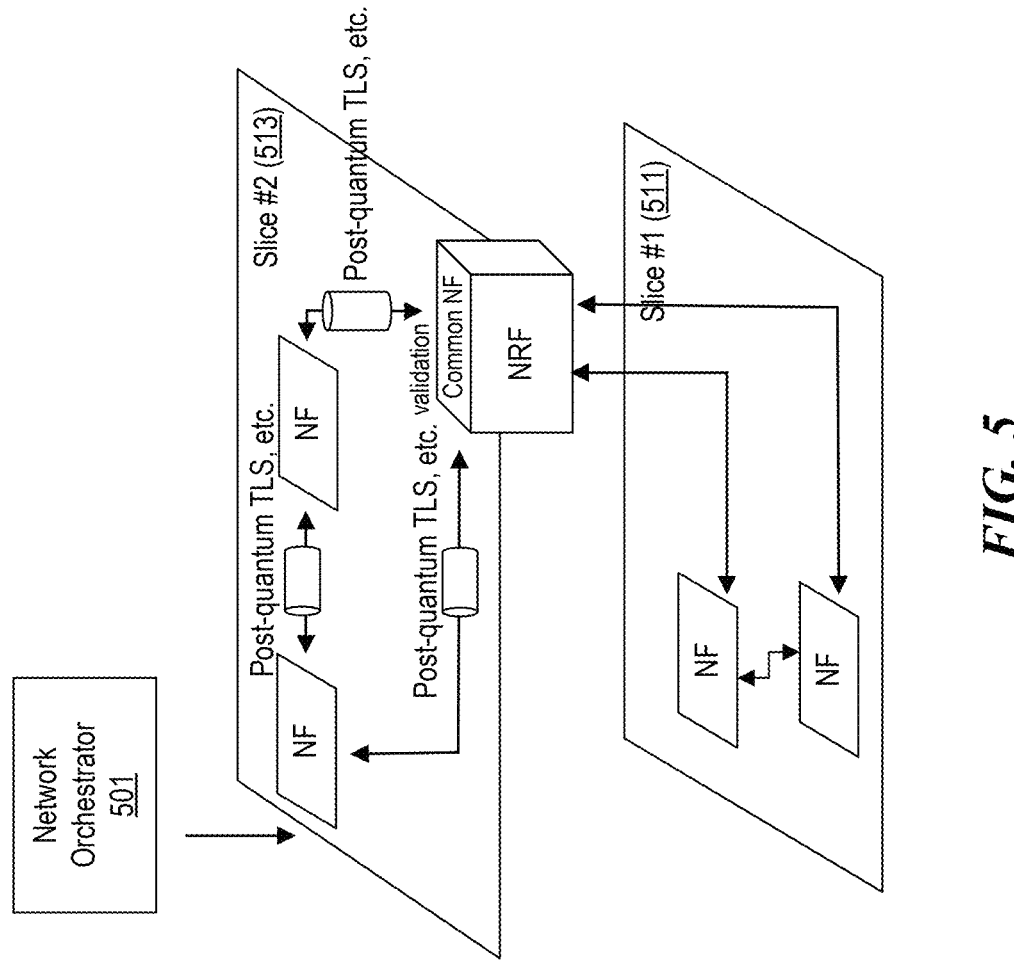
FIG. 5 illustrates an example configuration of a core network in accordance with one or more embodiments of the present technology.

FIG. 5 illustrates an example configuration of a core network in accordance with one or more embodiments of the present technology. The example shown in this figure focuses on configuration of the Service Based Architecture (SBA) where two network slices are shown. Both network slices support different security controls. Both network slices share some common Network Functions (e.g., the NRF as shown in FIG. 5). Different QoS parameters can be defined on RAN and transport for each network slice (not shown in this figure). In this example, the network orchestrator 501 manages slice #1 (511) according to the conventional implementation of SBA-based core network functions. The network orchestrator 501 can also create and activate another network slice #2 (513) that is configured to support secure communication channels between the network functions. This configuration can be different from slice #1. In some embodiments, an option of more secure communication in the core network can be offered to end users (e.g., enterprises) to enable the end users to select or subscribe to the desired level of services. For example, a basic level of service can be provided using the network slice #1 (511). A premium level of secure service can be provided using the network slice #2 (513). In some embodiments, the user can subscribe to the secure service plan. The network slice #2 is then commissioned by the network orchestrator 501 to provide such service to the user.

Figure 6:
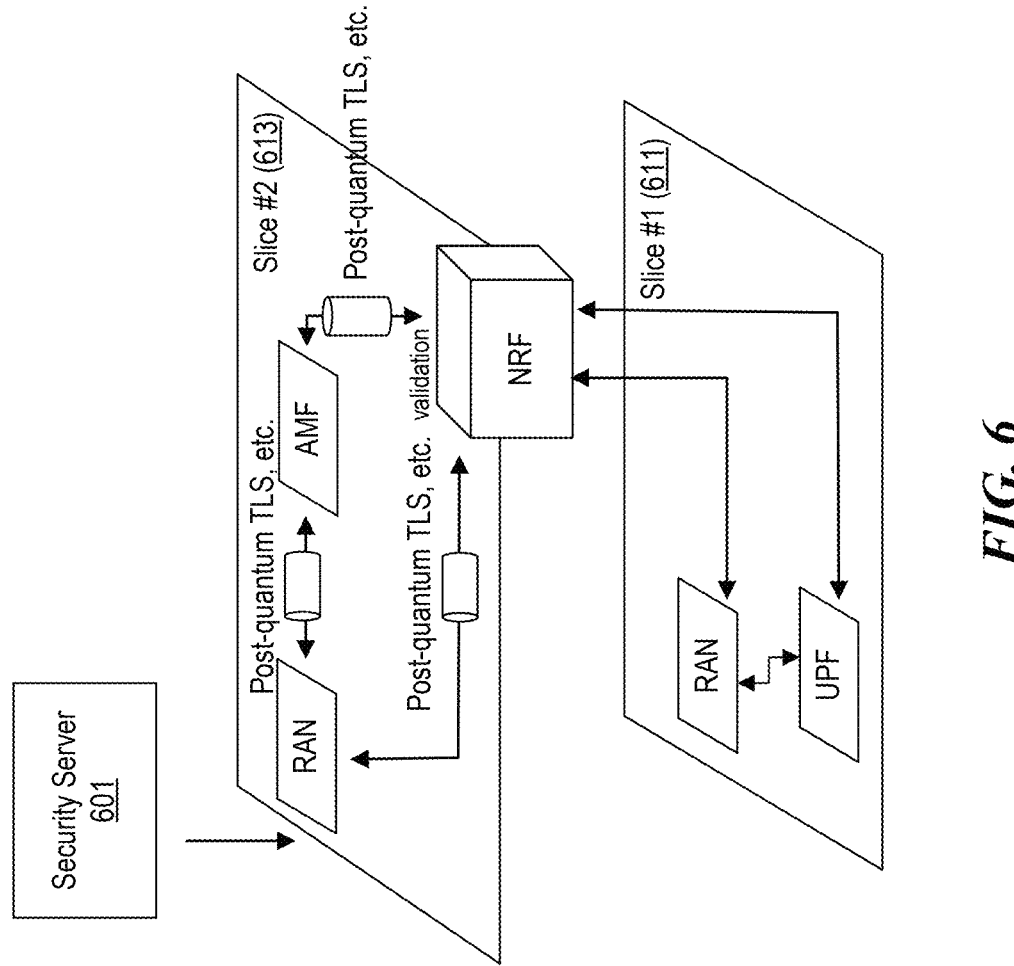
FIG. 6 illustrates another example configuration of a core network in accordance with one or more embodiments of the present technology.

FIG. 6 illustrates another example configuration of a core network in accordance with one or more embodiments of the present technology. The example shown in this figure focuses on configuration of the radio access network where two logical/conceptual network slices are shown. Both network slices support different security controls. Both network slices share some common network nodes (e.g., the NRF as shown in FIG. 6). Different QoS parameters can be defined on transport for each network slice. In this example, the security server 601 (e.g., the network orchestrator) manages slice #1 (611), with secure communication between a RAN and UPF. The security server 601 can also create and activate another network slice #2 (613) that is configured to support secure communication channels between another RAN and the AMF. Similar configuration can also be implemented in the transport layer of various network nodes.

The examples shown in FIGS. 7A-9B focus on the application of the disclosed techniques on network functions. It is noted that the disclosed techniques can also be applied to RANs and/or transport layer of other network nodes.

Figure 7A:
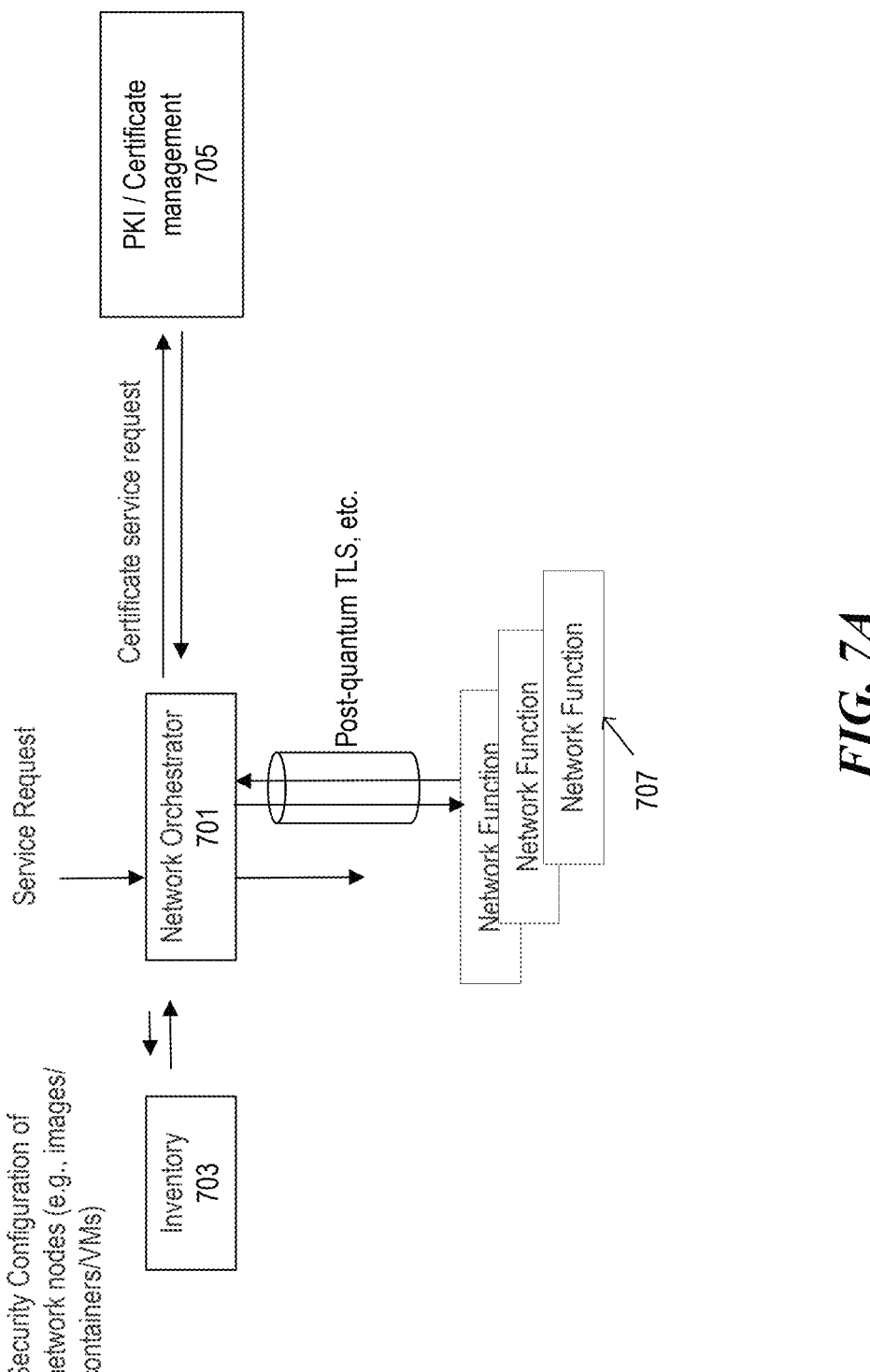
FIG. 7A illustrates an example architecture of a network orchestrator and network functions (NFs) in a core network in accordance with one or more embodiments of the present technology.

FIG. 7A illustrates an example architecture of a network orchestrator and network functions in a core network in accordance with one or more embodiments of the present technology. The network orchestrator 701 receives a service request for obtaining secure communication in the core network. Upon determining that a secure network slice instance has not been created yet, the network orchestrator initiates creation of a network slice instance by fetching the images, containers, virtual machines, security configurations, and/or attributes of network functions from the inventory server 703. The network orchestrator also requests security certificates for the network functions from the PKI or a certificate management server 705. The network orchestrator 701 forms security context(s) of network function(s) 707 based on the security certificate(s) and pushes the configuration of the security context(s) to the corresponding network function(s) 707.

Figure 8:
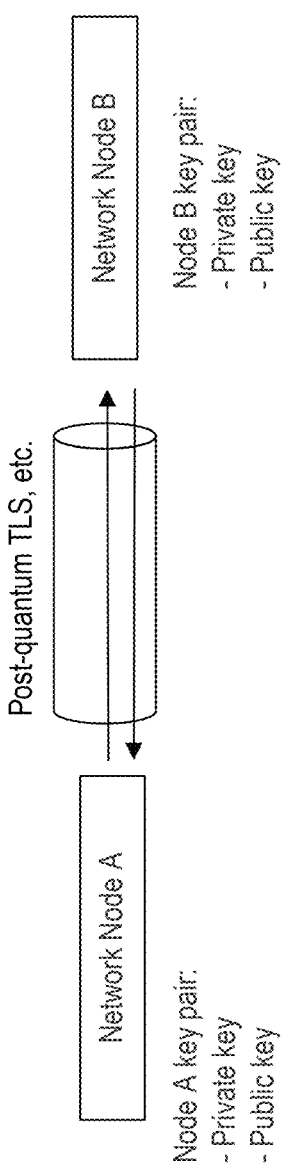
FIG. 8 illustrates an example communication between two NFs in accordance with one or more embodiments of the present technology.

In some embodiments, a security context includes a private and public key pair corresponding to a network function to enable secure communication between the network function and other network functions. FIG. 8 illustrates an example communication between two network functions in accordance with one or more embodiments of the present technology. In FIG. 8, both network functions obtain the private/public key pairs from the network orchestrator. Given the respective key pairs, an encrypted communication tunnel, such as post-Quantum TLS, mTLS, TDLS, IP Sec, etc. can be established between the two network functions to provide secure communications.

The security context includes information about the security certificate(s) and the corresponding algorithm(s). In some embodiments, the security context can be defined as a JSON object as follows. Other implementations of the security context can also be provided.

```
{
    NFType: "AMF"
    Image: "image.dockerfile",
    Interfaces: {
        NG: {
            IP Address: "2001:db8:85a3:8a2e:370:7334",
            SecurityContext: {Certificate:
                "cert1.cer",
                algorithm: "DTLS-HIMMO"
            }
            SBI: {
            IP Address: "2001:db8:85a3:8a2f:370:6774",
            SecurityContext: {
                Certificate: "cert2.cer",
                algorithm: "HRSS-SXY"
            }
        }
    }
}
```

Referring back to FIG. 7A, in some embodiments, based on the configuration information about the security context(s), the network function(s) 707 reach back to the network orchestrator 701 using a secure mechanism, such as Transport Layer Security (TLS) for encryption. As part of that request, the network function(s) 707 provide respective credential information, such as the Globally Unique Identifier (GUID). The credential information from the network function(s) 707 allows the network orchestrator 701 to determine the private and public key pairs and provide a pair to each corresponding network function.

In some embodiments, the network functions are in communication with the certificate management node directly to retrieve the security certificates during NF configuration and/or network slicing configuration. In some embodiments, the security certificates include the private/public key pairs to enable subsequent secure communication between the network functions. In some embodiments, the security certificates can be used for post-Quantum TLS, mTLS, TDLS, IP Sec, etc.

Figure 7B:
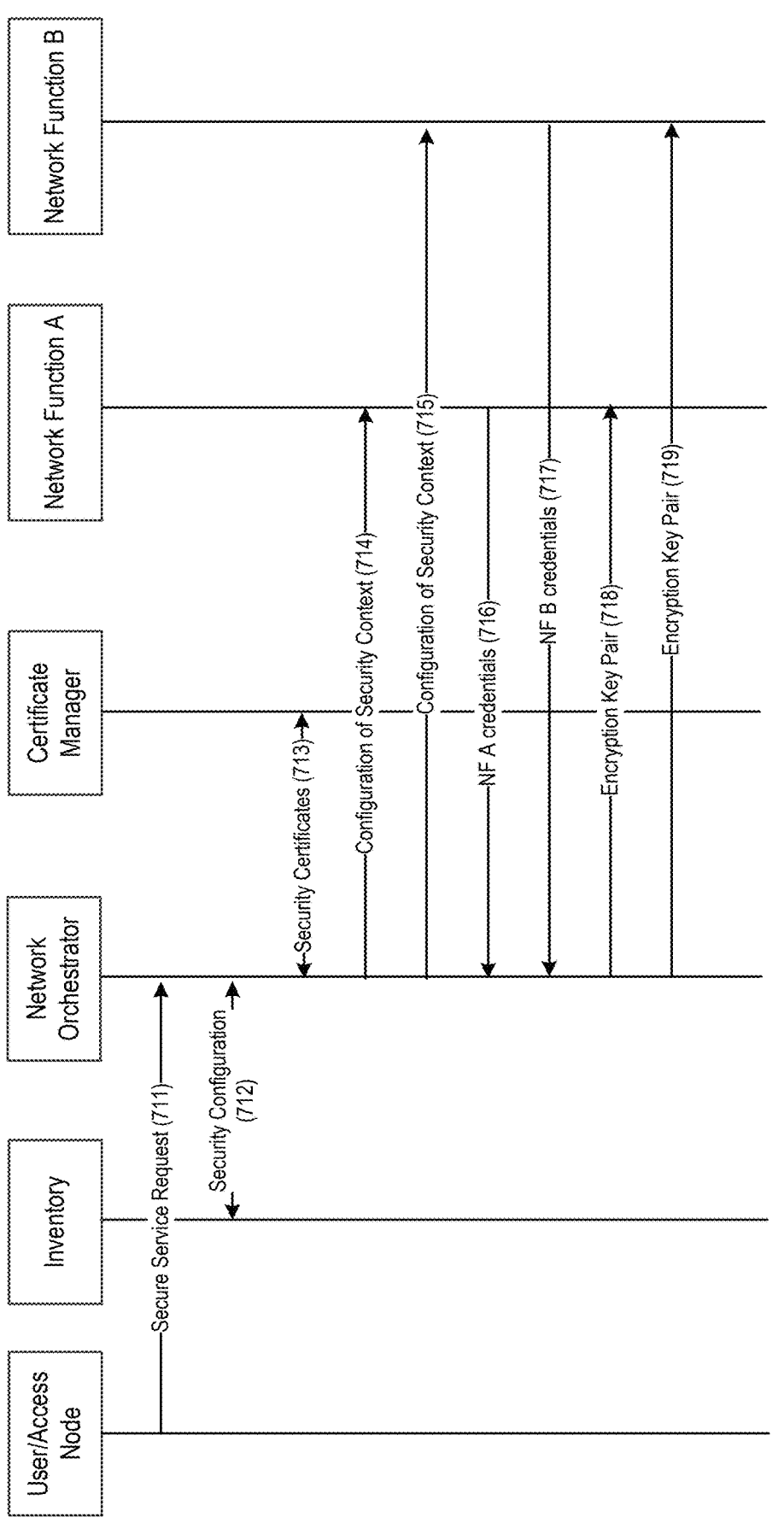
FIG. 7B illustrates an example call flow for creating a secure network slice in a core network in accordance with one or more embodiments of the present technology.

FIG. 7B illustrates an example call flow for creating a secure network slice in an SBA-based core network in accordance with one or more embodiments of the present technology. As shown in FIG. 7B, the network orchestrator receives a secure service request 711 from the user and/or via the access node. Upon determining that no secure network slicing instance is available yet, the network orchestrator retrieves images, containers, virtual machines, security configurations, and/or attributes of the relevant network function nodes from an inventory node at 712.

In some embodiments, the network orchestrator retrieves security certificates for the respective network functions from a certificate manager at 713. For each network function, the network orchestrator generates a security context for the corresponding network function based on the security certificate(s) and pushes configuration information of the security context to the respective network functions. For example, as shown in FIG. 7B, the network orchestrator sends the configuration of security context to Network Function A at 714 and sends the configuration of security context to Network Function B at 715.

In some embodiments, the configuration information of security contexts includes the private/public key pairs for the network functions. In some embodiments, as shown in FIG. 7B, the configuration information does not include the private/public key pairs. Instead, Network Function A and Network Function B respond with their respective credentials to the network orchestrator at 716 and 717. Based on the network function credentials, the network orchestrator sends the encryption key pairs to the corresponding network function. For example, the network orchestrator sends an encryption key pair to Network Function A at 618 and another encryption key pair to Network Function B at 718, 719. After obtaining the respective encryption key pairs, Network Function A and Network Function B can establish secure communication between each other. In some embodiments, Network Function A and Network Function B can communicate directly with the certificate manager (not shown) to retrieve the private/public key pairs for subsequent secure communications.

In some of the existing implementations of the core network, network slicing may not have been implemented (e.g., there is no existing network orchestrator). In some implementations, the network orchestrator is not in direct communication with the network functions. In those cases, an OSS is used to communicate with the network functions, the access network, and/or the transport layer of various network nodes. To enable the secure communication service, a network orchestrator can be deployed to be in communication with the OSS so as to ensure that security configuration information can be transmitted to the relevant network nodes (e.g., NFs, RAN, transport) via the OSS.

Figure 9A:
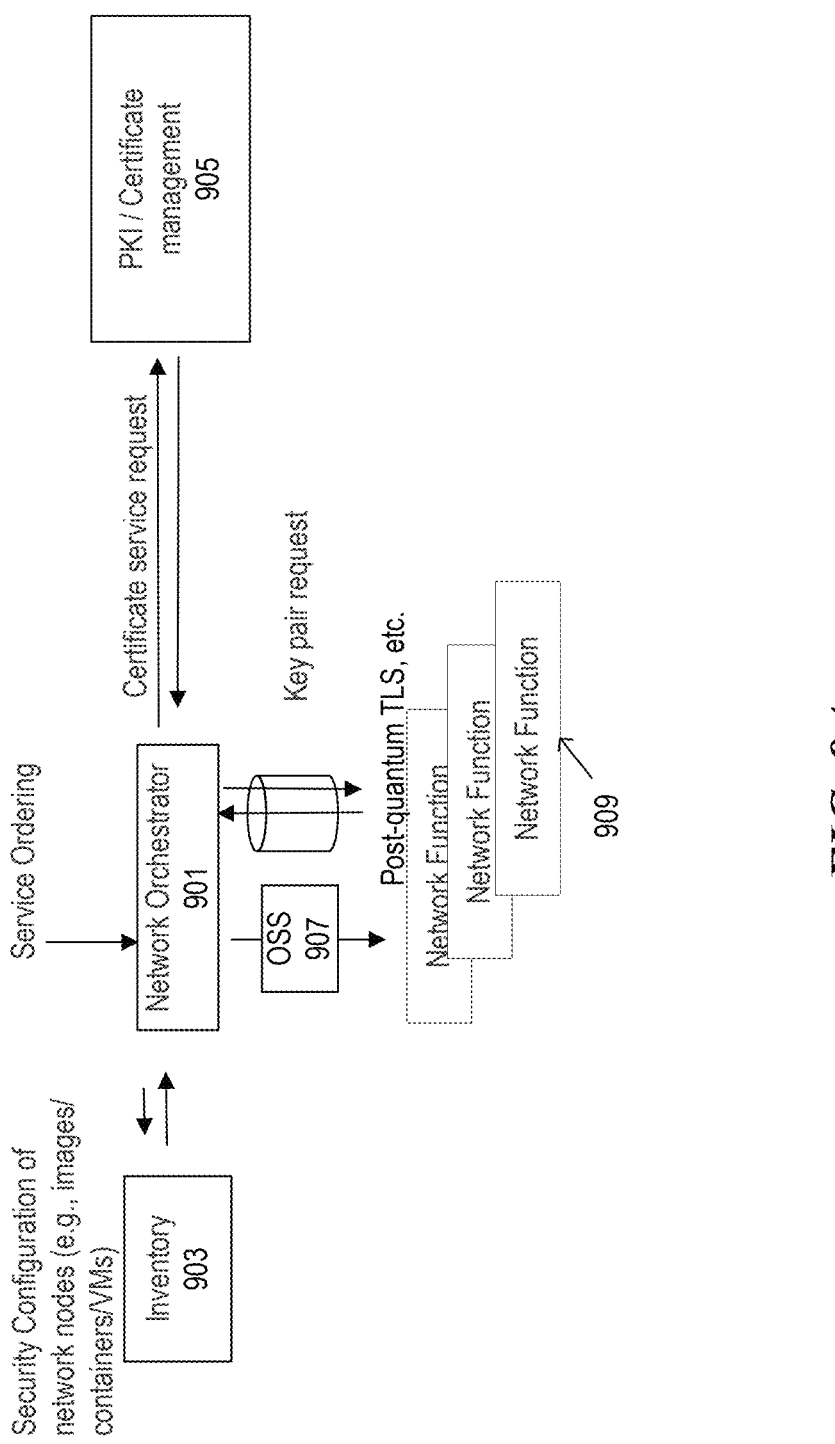
FIG. 9A illustrates another example architecture of a network orchestrator and an Operational Support System (OSS) in a core network in accordance with one or more embodiments of the present technology.

FIG. 9A illustrates another example architecture of a network orchestrator and an OSS in an SBA-based core network in accordance with one or more embodiments of the present technology. The network orchestrator 901 receives a service request for secure communication in the core network. The network orchestrator initiates creation of a network slice instance by fetching the images, containers, virtual machines, configurations, and/or attributes of network functions from an inventory server 903. The network orchestrator 901 also requests security certificates for the network functions from the PKI or a certificate management server 905. The network orchestrator 901 generates a security context of a network function based on the security certificate(s).

In this example, the network orchestrator 901 has not established direct communication with the network functions 909, and an OSS 907 is in communication with the network functions 909 to manage the operations of the network functions 909. Thus, the network orchestrator 901 pushes the configuration of the security context to the OSS 907 so that the OSS 907 can forward the configuration information to corresponding network function(s) 909.

Upon receiving the configuration information, the network function(s) 909 reach back to the network orchestrator 901 as a server based on the configuration information about the security context by sending a key pair request. In some embodiments, as part of that request, the network function(s) 909 provide respective credential information, such as the Globally Unique Identifier (GUID). The credential information from the network function(s) 909 allows the network orchestrator 901 to determine and provide the private and public key pair to each network function.

In some embodiments, the image/configuration/attribute of the network function from the inventory server 903 includes credentials, such as digital signature(s) of the corresponding network function. After obtaining the key pair, the network function can request, based on the security configuration, an image that is different from the image provided by the inventory node to obtain updates if needed.

Figure 9B:
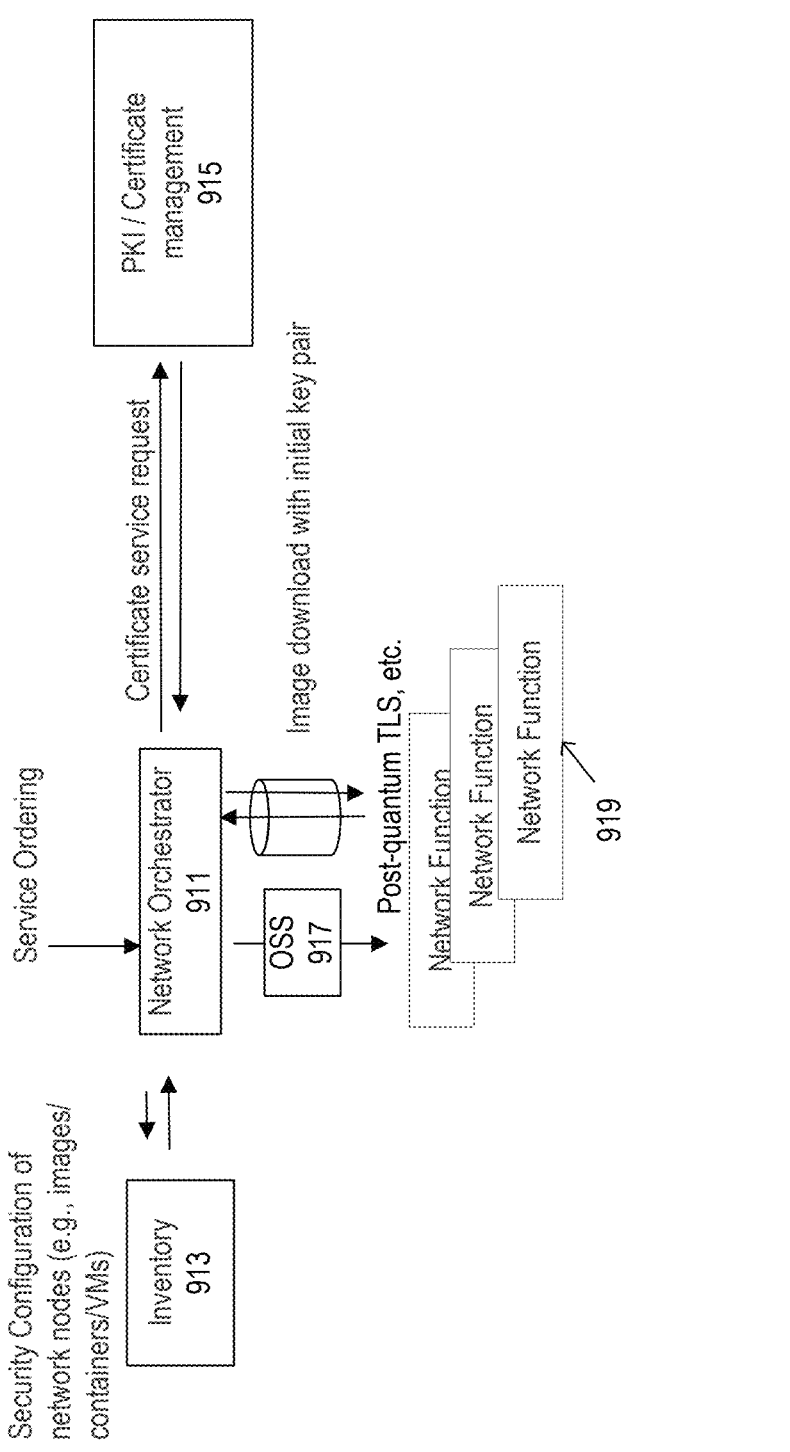
FIG. 9B illustrates yet another example architecture of a network orchestrator and an OSS in a core network in accordance with one or more embodiments of the present technology.

FIG. 9B illustrates yet another example architecture of a network orchestrator and an OSS in an SBA-based core network in accordance with one or more embodiments of the present technology. In this example, images, containers, virtual machines, security configurations, and/or attributes provided by the inventory node 913 can include a set of public/pair keys for communication with the orchestrator and/or other credentials of the network node (e.g., digital signature). The network orchestrator also requests security certificates for the network functions from the PKI or a certificate management server 915. The network orchestrator 911 forms a security context of a network function based on the security certificate(s). The network orchestrator 901 pushes the configuration of the security context to the OSS 917 so that the OSS can forward the configuration information to corresponding network function(s) 919. Upon receiving the configuration information, the network function(s) 909 reach back to the network orchestrator 901 via post-Quantum TLS, IPsec, TLS/mTLS, DTLS, etc. using the initial private/public key pair provided in the configuration information about the security context. The network function(s) can then download the images and/or attributes from the network orchestrator, along with the additional credential information. The network functions then retrieve a different pair of private/public keys for subsequent secure communications among each other.

Once secure communication channels between the network functions are established (e.g., using techniques shown in FIGS. 7A-9B), the network slice comprising the network functions is activated and can be used to provide secure service to the end users, e.g., as shown in FIG. 5.

It is noted that techniques shown in FIGS. 7A-9B focus on network functions but are also applicable to other components of the network, such as the access node(s) and/or transport layers of various network nodes. For example, the network orchestrator can push the configuration to the RAN, UPF, etc. via the AMF or the SMF, either directly by N2 or N4 interface or through the OSS, as shown in FIG. 2.

Figure 10:
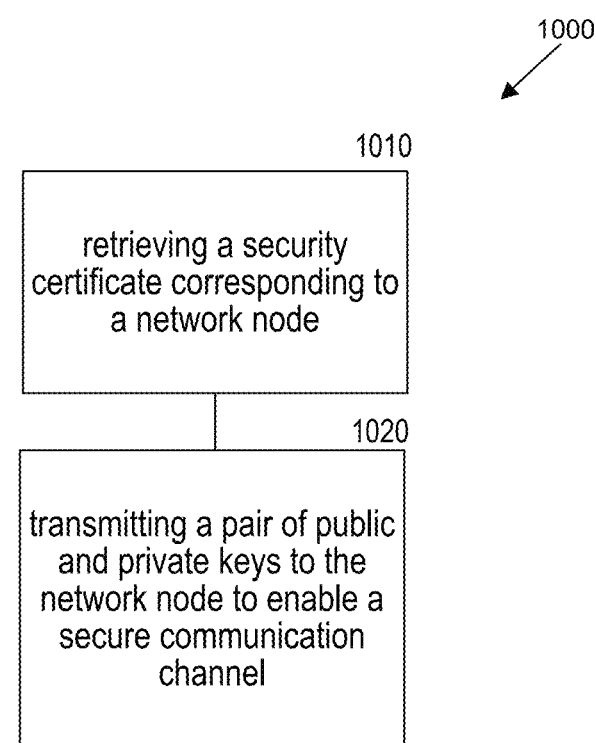
FIG. 10 is a flowchart representation of a method for providing secure communication in a network in accordance with one or more embodiments of the present technology.

FIG. 10 is a flowchart representation of a method for providing secure communication in a network in accordance with one or more embodiments of the present technology. The method 1000 includes, at operation 1010, retrieving, by a network server (e.g., a network orchestrator) configured to manage one or more network nodes in the network, a security certificate corresponding to a network node (e.g., a network function, a base station, etc.). In some embodiments, the network server can also retrieve IP configuration information of the interface(s). The method 1000 includes, at operation 1020, transmitting, by the network server based on the security certificate, a pair of public and private keys to the network node to enable the network node to establish a secure communication channel using an encrypted communication protocol with at least another network node.

In some embodiments, the one or more network nodes comprise at least a network function or a base station in a radio access network. In some embodiments, the secure communication channel is established at a transport layer of the network node.

In some embodiments, the method includes determining, by the network server, configuration information for the network node based on the security certificate and transmitting, by the network server, the configuration information to the network node. In some embodiments, the configuration information comprises the pair of public and private keys. In some embodiments, the method includes receiving, in response to the configuration information, credential information from the network node and determining the pair of public and private keys based on the credential information of the network node.

In some embodiments, the method includes receiving information about the one or more network nodes from another network server. The information includes at least one of an image of a network node, a configuration parameter of the network node, or an attribute of the network node. In some embodiments, the information about the one or more network nodes comprises credential information of the one or more network nodes, the credential information comprising at least a digital signature of a network node.

Figure 11:
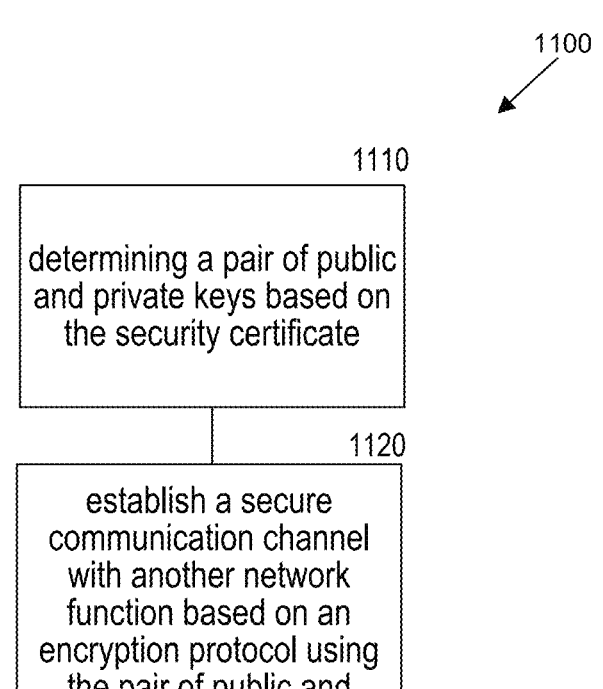
FIG. 11 is a flowchart representation of another method for providing secure communication in a network in accordance with one or more embodiments of the present technology.

FIG. 11 is a flowchart representation of a method for providing secure communication in a network in accordance with one or more embodiments of the present technology. The method 1100 includes, at operation 1110, determining, by a network node, a pair of public and private keys based on the security certificate. In some embodiments, the network node is also configured to determine the IP configuration information on the interface(s). The method 1100 includes, at operation 1120, establishing, by the network node, a secure communication channel with another network node based on an encryption protocol using the pair of public and private keys.

In some embodiments, the method includes receiving, by the network node, the security certificate from a network server. In some embodiments, the network server comprises a certificate management node or a network orchestrator.

In some embodiments, the method includes receiving, by the network node, an initial pair of public and private keys and establishing an initial communication channel with the network server using the initial pair of public and private keys.

Figure 12:
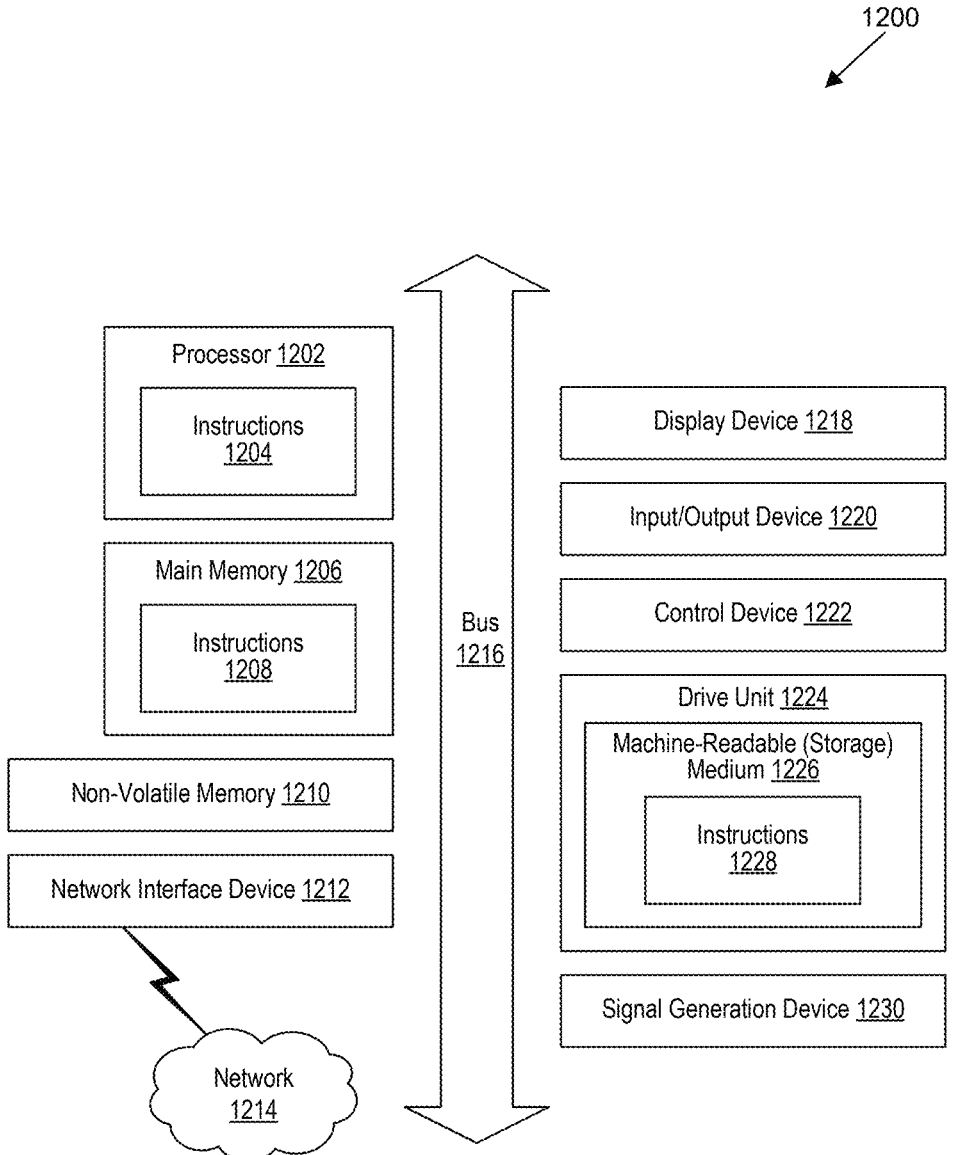
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include one or more processors 1202, main memory 1206, non-volatile memory 1210, a network interface device 1212, a video display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer system (SBC), or a distributed system such as a mesh of computer systems, or it can include one or more cloud components in one or more networks. Where appropriate, one or more computer systems 1200 can perform operations in real-time, in near real-time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A hardware system for secure communication in a network, comprising:
   a first network server configured to manage one or more security certificates for the network; and
   a second network server configured to manage an operation of one or more network nodes in the network,
   wherein the second network server is configured to:
      retrieve the one or more security certificates and one or more security configurations from the first network server; and
      transmit, based on (1) the one or more security certificates and (2) a first security configuration of the one or more security configurations retrieved from the first network server, a first pair of public and private keys to a first network node to enable the first network node to establish a first communication channel with a second network node using a first encrypted communication protocol according to the first security configuration,
         wherein the first communication channel is within a first network slice; and
      transmit, based on (1) the one or more security certificates and (2) a second security configuration of the one or more security configurations retrieved from the first network server, a second pair of public and private keys to a third network node to enable the third network node to establish a second communication channel with at least a fourth network node,
         wherein the second communication channel is within a second network slice different from the first network slice and uses a second encrypted communication protocol different from the first encrypted communication protocol, and
         wherein the second encrypted communication protocol is according to the second security configuration different from the first security configuration.

2. The hardware system of claim 1, wherein the first network server comprises a Public Key Infrastructure or a certificate management server.

3. The hardware system of claim 1, wherein the second network server is configured to:
   determine configuration information for the first network node based on the one or more security certificates; and
   transmit the configuration information to the first network node.

4. The hardware system of claim 3, wherein the configuration information comprises the first pair of public and private keys, and wherein the second network server is configured to transmit the first pair of public and private keys to the first network node by transmitting the configuration information to the first network node.

5. The hardware system of claim 3, wherein the second network server is further configured to:
   receive, in response to the configuration information, credential information from the first network node; and
   determine the first pair of public and private keys based on the credential information of the first network node.

6. The hardware system of claim 1, wherein the second network server is configured to:
   receive information about the one or more network nodes from a third network server, the information comprising at least one of an image of a network node, a configuration parameter of the network node, or an attribute of the network node.

7. The hardware system of claim 6, wherein the information about the one or more network nodes comprises credential information of the one or more network nodes, the credential information comprising at least a digital signature of a network node.

8. The hardware system of claim 6, wherein the information about the one or more network nodes comprises an initial set of public and private keys to enable a network node to establish a secure communication channel with the second network server.

9. The hardware system of claim 1, wherein the second network server is configured to:

determine configuration information for the first network node based on the one or more security certificates; and transmit the configuration information to an operational support server to enable the operational support server to forward the configuration information to the one or more network nodes.

10. The hardware system of claim 1, wherein the second network server comprises a network orchestrator.

11. The hardware system of claim 1, wherein the first network node and the second network node are network functions configured in a network slice.

12. The hardware system of claim 1, wherein the first network node comprises a radio access node.

13. The hardware system of claim 1, wherein the first communication channel is established at a transport layer of the first network node and the second network node.

14. A method for providing secure communication in a network, comprising:

retrieving, by a network server configured to manage one or more network nodes in the network, a security certificate and one or more security configurations corresponding to a first network node of the one or more network nodes; and transmitting, by the network server (1) based on the security certificate and (2) a first security configuration of the one or more security configurations, a first pair of public and private keys to the first network node to enable the first network node to establish a first secure communication channel with at least a second network node of the one or more network nodes using a first encrypted communication protocol according to the first security configuration, wherein the first secure communication channel is within a first network slice; and transmitting, based on (1) the security certificate and (2) a second security configuration of the one or more security configurations, a second pair of public and private keys to a third network node of the one or more network nodes to enable the third network node to establish a second secure communication channel with at least a fourth network node of the one or more network nodes, wherein the second secure communication channel is within a second network slice different from the first network slice and uses a second encrypted communication protocol different from the first encrypted communication protocol, and wherein the second encrypted communication protocol is according to the second security configuration different from the first security configuration.

15. The method of claim 14, wherein the one or more network nodes comprise at least a network function or a base station in a radio access network.

16. The method of claim 14, wherein the first encrypted communication protocol comprises at least one of a Post-Quantum security protocol, a Transport Layer Security (TLS) protocol, an mTLS protocol, a Datagram TLS (DTLS) protocol, or an Internet-Protocol Security (IPsec) protocol.

17. The method of claim 14, comprising:

determining, by the network server, configuration information for the first network node based on the security certificate; and transmitting, by the network server, the configuration information to the first network node.

18. The method of claim 17, wherein the configuration information comprises the first pair of public and private keys, and wherein the configuration information comprises an Internet Protocol (IP) configuration of at least a communication interface of the first network node.

19. A method for providing secure communication in a network, comprising:

determining, by a first network node in the network and determined based on one or more security certificates and one or more security configurations, a first pair of public and private keys and a second pair of public and private keys;

establishing, by the first network node and based on (1) the one or more security certificates and (2) a first security configuration of one or more security configurations, a first secure communication channel with a second network node based on a first encryption protocol using the first pair of public and private keys, wherein the first encryption protocol is according to the first security configuration, and wherein the first secure communication channel is within a first network slice of the network; and establishing, by the first network node and based on (1) the one or more security certificates and (2) a second security configuration of the one or more security configurations, a second secure communication channel, within a second network slice of the network that is different from the first network slice, with a third network node based on a second encryption protocol using the second pair of public and private keys, wherein the second encryption protocol is according to the second security configuration different from the first security configuration, and wherein the second encryption protocol is different from the first encryption protocol.

20. The method of claim 19, further comprising:

receiving, by the first network node, an initial pair of public and private keys; and establishing an initial communication channel with a network server using the initial pair of public and private keys.

\* \* \* \* \*